US009060280B2

(12) United States Patent
Koo et al.

(10) Patent No.: US 9,060,280 B2
(45) Date of Patent: Jun. 16, 2015

(54) ENHANCED IN-DEVICE COEXISTENCE INTERFERENCE AVOIDANCE USING PREDETERMINED DOWNLINK CHANNEL

(75) Inventors: Changhoi C. Koo, Plano, TX (US); Zhijun Cai, Euless, TX (US); Youn Hyoung Heo, Hwasung (KR)

(73) Assignee: BlackBerry Limited, Waterloo, Ontario (CA)

( * ) Notice: Subject to any disclaimer, the term of this patent is extended or adjusted under 35 U.S.C. 154(b) by 883 days.

(21) Appl. No.: 13/194,380

(22) Filed: Jul. 29, 2011

(65) Prior Publication Data

US 2013/0029704 A1     Jan. 31, 2013

(51) Int. Cl.
*H04B 1/00* (2006.01)
*H04B 15/00* (2006.01)
*H04W 16/14* (2009.01)
*H04W 72/04* (2009.01)
*H04W 72/08* (2009.01)
*H04W 88/06* (2009.01)

(52) U.S. Cl.
CPC ............ *H04W 16/14* (2013.01); *H04W 72/042* (2013.01); *H04W 72/082* (2013.01); *H04W 88/06* (2013.01)

(58) Field of Classification Search
CPC . H04W 88/06; H04W 72/1215; H04W 16/14; H04W 72/02; H04W 84/18; H04W 24/00; H04W 28/04; H04W 28/048; H04W 4/00; H04W 52/242; H04W 52/243; H04W 8/005; H04B 15/02; H04B 1/006; H04B 1/406; H04M 2250/02; H04M 2250/06
USPC ............... 455/67.11, 63.1, 41.2, 552.1, 553.1
See application file for complete search history.

(56) References Cited

U.S. PATENT DOCUMENTS

| 7,725,118 | B2 * | 5/2010 | Yang et al. ..................... 455/502 |
| 8,005,108 | B1 * | 8/2011 | Broad et al. .................. 370/432 |
| 8,095,176 | B2 * | 1/2012 | Sudak .......................... 455/552.1 |
| 8,185,058 | B2 * | 5/2012 | Capretta et al. ............. 455/67.13 |
| 8,412,263 | B2 * | 4/2013 | Sudak .......................... 455/552.1 |
| 8,693,950 | B2 * | 4/2014 | Desai ............................ 455/41.2 |
| 2003/0098792 | A1 * | 5/2003 | Edwards et al. ............ 340/573.1 |

(Continued)

FOREIGN PATENT DOCUMENTS

WO      2009/137295      11/2009

OTHER PUBLICATIONS

Long Term Evolution, 3GPP LTE Radio and Cellular Technology, Edited by Borko Furht and Syed A . Ahson Auerbach Publications 2009, Chapter 4.*

(Continued)

*Primary Examiner* — Lewis West
(74) *Attorney, Agent, or Firm* — Fish & Richardson P.C.

(57) ABSTRACT

A method, system and device are provided for avoiding in-device coexistence interference between different radio technologies deployed in adjacent bands on the same device by allocating a non-interfering downlink signaling channel for downlink reception of interference avoidance instructions at the UE device. In operation, a user equipment device detects IDC interference and sends an IDC indication message to the radio network to get an appropriate solution, but instead of waiting at the current frequency to receive the IDC response from the radio network, the user equipment device moves to a non-interfering downlink signaling channel for downlink reception of interference avoidance instructions.

37 Claims, 6 Drawing Sheets

(56) References Cited

U.S. PATENT DOCUMENTS

| | | | |
|---|---|---|---|
| 2008/0051085 A1* | 2/2008 | Ganton | 455/435.2 |
| 2009/0279511 A1 | 11/2009 | Zhu | |
| 2010/0197235 A1* | 8/2010 | Wilhelmsson | 455/63.3 |
| 2011/0157957 A1* | 6/2011 | Kim | 365/148 |
| 2012/0033762 A1* | 2/2012 | Tseng et al. | 375/316 |
| 2012/0034913 A1* | 2/2012 | Wang et al. | 455/426.1 |
| 2012/0071185 A1 | 3/2012 | Dayal et al. | |
| 2012/0094681 A1 | 4/2012 | Freda et al. | |
| 2012/0155303 A1 | 6/2012 | Kuo | |
| 2012/0164948 A1* | 6/2012 | Narasimha et al. | 455/63.1 |
| 2012/0195291 A1 | 8/2012 | Kuo | |
| 2012/0207040 A1 | 8/2012 | Comsa et al. | |
| 2012/0213162 A1 | 8/2012 | Koo et al. | |
| 2012/0214489 A1 | 8/2012 | Koo et al. | |

OTHER PUBLICATIONS

International Search Report and Written Opinion of the International Searching Authority issued in International Application No. PCT/US2011/045910 on May 22, 2012; 17 pages.
Office Action issued in U.S. Appl. No. 13/194,412 on May 23, 2013; 14 pages.
Office Action issued in U.S. Appl. No. 13/194,412 on Aug. 2, 2013.
Notice of Allowance issued in U.S. Appl. No. 13/194,412 on Apr. 24, 2014.
International Preliminary Report on Patentability under Chapter I issued in International Application No. PCT/US2011/045874 on Feb. 13, 2014; 8 pages.
International Preliminary Report on Patentability under Chapter I issued in International Application No. PCT/US2011/045910 on Feb. 13, 2014; 11 pages.
3GPP TR 36.816 V1.0.0 (Nov. 2010); "3rd Generation Partnership Project; Technical Specification Group Radio Access Networks; Evolved Universal Terrestrial Radio Access (E-UTRA); Study on Signalling and Procedures for Interference Avoidance for In-Device Coexistence (Release 10)"; Dec. 17, 2010; 34 pages.
Intel Corporation (UK Limited); "Discussion on In-Device Coexistence Scenarios and Solutions"; 3GPP TSG-RANN WG2 #71 (R2-104382); Madrid, Spain; Aug. 23-27, 2010; 3 pages.
MediaTek; "Investigation on RRM Solutions for In-Device Coexistence"; 3GPP TSG-RAN WG2 Meeting #71bis (R2-105448); Xi'An, China; Oct. 11-15, 2010; 3 pages.
Research in Motion UK Limited; "Buffer Status Reporting for TDM Solution"; 3GPP Draft RAN WG2 (R2-113881); Athens Greece; Aug. 15, 2011; 4 pages.
International Search Report and Written Opinion of the International Searching Authority issued in International Application No. PCT/US2011/045874 on Mar. 21, 2012; 13 pages.
Invitation to Pay Additional Fees and Partial International Search Report issued in International Application No. PCT/US2011/045910 on Mar. 29, 2012; 8 pages.
3GPP TSG RAN #48, RP-100671, New Study Item Proposal: Signalling and procedure for in-device coexistence interference avoidance, Seoul, Korea, Jun. 2010.
3GPP TSG RAN WG4 Meeting #55, R4-102268: LS on in-device coexistence interference, Montreal, Canada, May 2010.
3GPP TSG RAN WG4 Meeting #54, R4-100706: Coexistence studies between LTE and WLAN, San Francisco CA, Feb. 2010.
3GPP TSG RAN WG4 Meeting #54, R4-100707: Addition of LTE UE RF requirements for coexistence with WLAN, San Francisco CA, Feb. 2010.
3GPP TR36.816 v1: Technical Specification Group Radio Access Networks; Evolved universal Terrestrial Radio Access (E-UTRA); Study on signalling and procedure for interference avoidance for in-device coexistence (Release 10), Aug. 2010.
3GPP TS36.321: Technical Specification Group Radio Access Networks; Evolved Universal Terrestrial Radio Access (E-UTRA); Medium Access Control (MAC) protocol specification (Release 10), Dec. 2010.
Communication under Rule 71(3) EPC issued in European Application No. 11743912.5 on Dec. 11, 2014; 47 pages.
Communication under Rule 71(3) EPC issued in European Application No. 11751983.5 on Nov. 24, 2014; 58 pages.

* cited by examiner

ENHANCED IN-DEVICE COEXISTENCE INTERFERENCE AVOIDANCE USING PREDETERMINED DOWNLINK CHANNEL

BACKGROUND

1. Field

In general, communications systems and methods for operating same are disclosed. In one aspect, methods, systems and devices are disclosed for managing coexistence interference between different radio technologies deployed in adjacent bands.

2. Description of the Related Art

The growing market of smart connected devices requires that the same device supports multiple radio technologies on the in-device platform. However, some configurations may cause severe performance degradation due to mutual in-device coexistence (IDC) interference. For example, with devices that support both Long Term Evolution (LTE) and Industrial, Science and Medical (ISM) technologies (such as Bluetooth and/or WLAN) and/or Global Navigation Satellite System (GNSS) technologies, there are use cases for concurrent operation of these radios. Coexistence issues may arise between ISM and/or GNSS technologies and LTE deployed in adjacent bands. As shown in Table 1 below, coexistence interference may arise where ISM transmission creates interference to the LTE receiver, and may also arise where LTE transmission creates interference to the ISM receiver.

TABLE 1

Interference of the LTE and ISM components on the in-device configuration

| LTE TDD (2.3-2.4 GHz, Band 40) LTE UL (2.5-2.6 GHz, Band 7) | ISM (2.4-2.4835 GHz) | Coexistence |
|---|---|---|
| Rx | Tx | LTE: Interfered ISM: Normal |
| Tx | Rx | LTE: Normal ISM: Interfered |

Similar coexistence issues may occur with devices that include both LTE and GNSS components. As shown in Table 2 below, when LTE and GNSS components are working on the same device, there may be interference due to adjacent frequency band operation or harmonic frequencies which cannot be avoided by the allocation of a guard band at the sub-harmonic frequency.

TABLE 2

Interference of the LTE and GNSS component configuration on in-device

| LTE (777-787 MHz/746-756 MHz, Band 13) (788-798 MHz/758-768 MHz, Band 14) | GNSS (1575.42 MHz) | Coexistence |
|---|---|---|
| Tx | Rx | LTE: Normal GNSS: Interfered |

As will be appreciated, there are challenges to using current state-of-the-art filter technology to address coexistence interference since filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

Reference is now made to the following drawings, in which.

DETAILED DESCRIPTION

Figure 1:
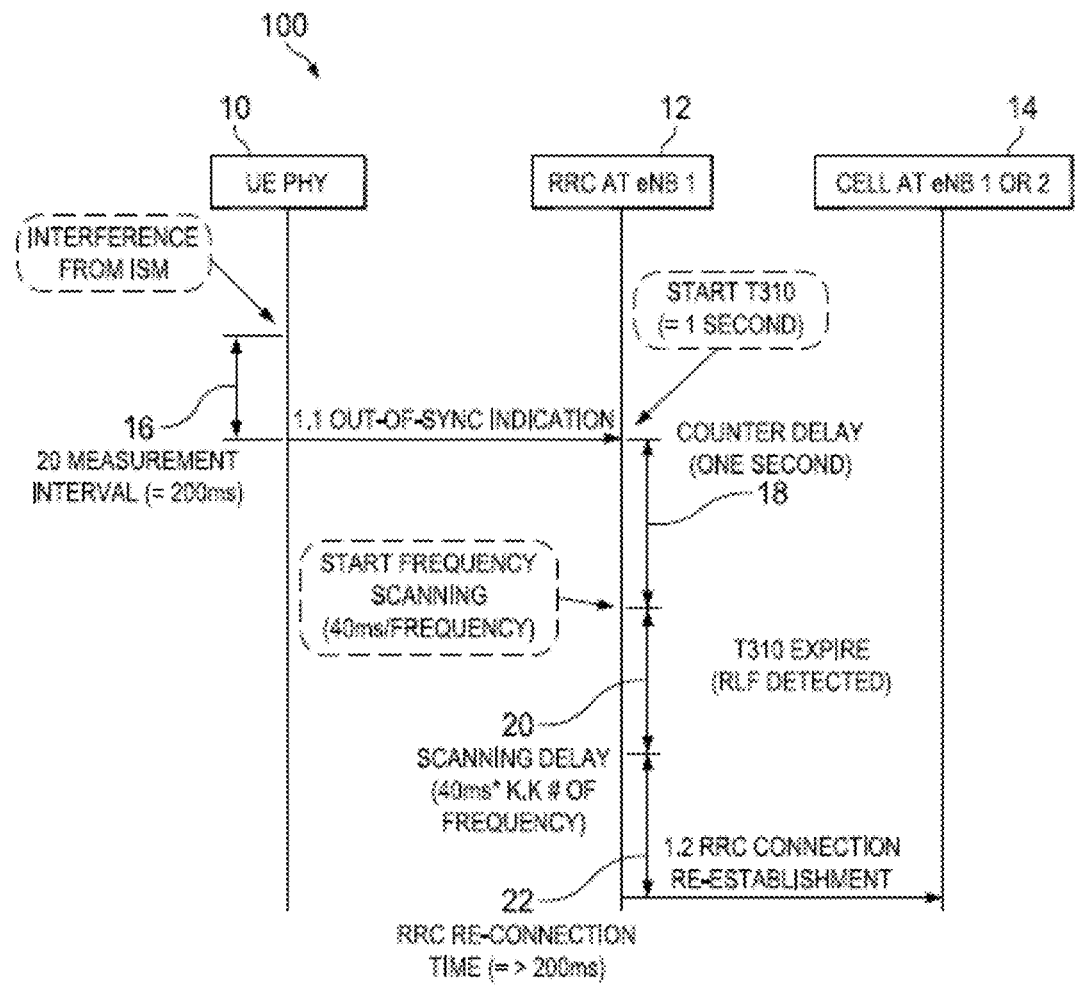
FIG. 1 is a signal flow diagram illustrating how existing radio resource management signaling procedures may be used to address coexistence interference.

A method, system and device are provided for avoiding in-device coexistence (IDC) interference between different radio technologies deployed on the same device. In selected embodiments, a method and apparatus are provided for allocating a non-interfering downlink signaling channel for downlink reception of interference avoidance instructions at the UE device. In operation, a user equipment device detects IDC interference between a first radio component (e.g., LTE component) and a second radio component (e.g., ISM component), such as can occur when a non-LTE component is enabled to create potential interference with reception of downlink signals by the LTE component. The user equipment device then sends an IDC indication message to the radio network to get an appropriate solution, but instead of waiting at the current frequency to receive the IDC response from the radio network, the user equipment device moves to a non-interfering downlink signaling channel for downlink reception of interference avoidance instructions. The non-interfering downlink signaling channel is allocated as a carrier frequency that is safely remote from the ISM band for use in IDC operation to avoid potential downlink interference.

Various illustrative embodiments will now be described in detail with reference to the accompanying figures. While various details are set forth in the following description, it will be appreciated that the embodiments may be practiced without these specific details, and that numerous implementation-specific decisions may be made to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments will now be described in detail below with reference to the figures.

Ongoing 3GPP discussions have addressed the technical challenges associated with addressing interference caused by concurrent operation of multiple radio technologies. The difficulties here may be understood with reference to the example of a single device which supports LTE technology with ISM (e.g., Bluetooth and/or WLAN) and/or GNSS technologies which can interfere with one another, such as when the ISM transmitter interferes with the LTE receiver, or when the LTE transmitter causes interference with the ISM and GNSS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GNSS components. Currently, there is no RRM (Radio Resource Management) mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

There have been attempts to address the coexistence interference problems using existing radio resource management (RRM) mechanisms and signaling procedures, such as RSRQ (Reference Signal Received Quality) measurement, inter-frequency/inter-RAT handover, cell (re)selection, RLF (Radio Link Failure) monitoring and connection (re)establishment. The main issues and discussions are on 1) how to identify the in-device coexistence interference 2) how to notify the network of in-device coexistence interferences 3) what kind of signaling, operation and procedures are necessary to avoid in-device coexistence interference and 4) how to choose the best way, Frequency Division Multiplexing (FDM) or Time Division Multiplexing (TDM), to avoid in-device coexistence interferences, etc. However, existing procedures require further evaluation to determine if they could handle the coexistence interference and guarantee the required quality of service (QoS). For example, a normal LTE handover procedure using RRC (Radio Resource Control) message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

One such problem with using existing RRM mechanism is the QoS degradation caused by delay in recovering from RLF which is supposed to be used only in extreme scenarios and is not designed for maintaining QoS guarantee of an on-going connection. In particular and as illustrated with reference to the signal flow diagram 100 shown FIG. 1, the time to declare RLF can be quite large, depending on the network settings of the RLF timer T310. Once the UE 10 has declared DL RLF upon detecting interference from another device radio component (e.g., ISM), the UE performs an initial search during a first measurement interval 16 before sending the Out-of-Synch Indication (signal flow 1.1), shown in this example as requiring 200 ms. Then, the UE must access a different channel which leads to additional delay at the source eNB 12 associated with the counter delay 18 from the RLF timer T310 (e.g., 1000 ms), frequency scanning delay 20 (e.g., 40 ms×k, where k is the number of frequencies), and RRC reconnection time 22 (e.g., at least 200 ms) until such time as RRC connection is established via signal flow 1.2 to cell 14 at the same or different eNB. In this example, RLF recovery can take at least 1.56 sec (=200 ms+1000 ms+40 ms*k+200 ms, when k=4) to determine and recover from radio link failure.

A number of contributions, proposals and issues have been proposed to resolve the in-device coexistence problem, but final conclusions have not been reached. For example and as disclosed at 3GPP TR36.816 v1.0.0.1: entitled "Study on signalling and procedure for interference avoidance for in-device coexistence" (Release 10), three different operation modes ("Uncoordinated," "Coordinated within UE only" and "Coordinated within UE and Network") and basic solutions (FDM and TDM) are proposed. In the "Uncoordinated" mode, different components within the same UE operate independently without any internal coordination between different components (LTE, ISM and GNSS). In the "Coordinated within UE only mode," there is an internal coordination between the different components within the same UE, which means that at least the activities of one radio is known by other component's radio, however the eNB is not aware of the coexistence issue possibly experienced by the UE and is therefore not involved in the coordination. In the "Coordinated within UE and with Network mode," different components within the UE are aware of possible coexistence problems and the UE can inform the eNB about such information and problems, so it is then mainly up to the network to decide how to avoid coexistence interference. As proposed, FDM has two different possible solutions, 1) moving LTE signal away from ISM frequency band and 2) moving ISM signal away from LTE frequency band. Based on these potential solutions and modes, some proposals and decisions have been made as a baseline for the initial discussion and study, but only concept and problem in principle have been introduced and captured, and more detail solutions and proposals will be submitted and presented in the future meetings.

FDM Solutions

With FDM solutions, the UE informs the E-UTRAN when transmission/reception of LTE or other radio signal would benefit or no longer benefit from LTE not using certain carriers or frequency resources. With this approach, UE judgment is taken as a baseline approach for the FDM solution, i.e., the UE will indicate which frequencies are (not) useable due to in-device coexistence. The indication can be sent by the UE whenever it has a problem in ISM DL reception it cannot solve by itself. The indication can also be sent by the UE whenever it has a problem in LTE DL reception it cannot solve by itself, and the eNB did not take action yet based on RRM measurements. When LTE UL transmission interferes with ISM/GNSS DL reception, LTE measurements cannot be used to detect the problem and the details of the trigger(s) for the UE to report the problem will probably not be specified in 3GPP. When ISM UL transmission interferes with LTE DL reception, it needs to be determined whether more detailed LTE DL measurement or trigger needs to be specified (e.g., with respect to when to take the measurement in relation to ISM transmissions).

The indication from the UE that a problem occurs can be classified as either reactive (meaning that a problem is reported only when it is detected), or proactive (meaning that potential problems are reported). Reactive indications are supported as the baseline and it is still be determined whether proactive indications, which are not based on LTE DL measurements, should be allowed. Proactive refers to the case that the UE reports that a frequency (serving frequency or candidate frequency) may suffer from unacceptable high interference if the ISM transmitter increases its activity. Proactive indications could be sent in the following two cases: 1) the UE asks the network not to hand itself over to certain of non-serving frequencies that may experience coexistence issues (e.g., due to increase of ISM traffic), or 2) the UE asks the network to change current serving frequency because coexistence problems may become serious due to increased ISM traffic.

In response to the UE's indication message to the eNB that there is interference from non-LTE components, the eNB sends a response message with any solution, FDM or TDM, to restore communication with the eNB. However, the response message may not be received correctly if DL reception of LTE component is severely interfered by UL transmission of non-LTE components.

The standards groups have not yet determined how to prevent interference with the response messages. To address this scenario, selected embodiments propose the allocation of a non-interfering downlink signaling channel which can avoid interference, though it will be appreciated that the proposal also applies to TDM solutions as described below.

TDM Solutions

With TDM solutions, it is assumed that SCO, eSCO, A2DP and ACL protocols are supported by in-device BT radio when analyzing the TDM solutions for LTE-BT coexistence. In addition, beacon, power saving and DCF protocols are assumed to be supported by in-device WiFi radio when analyzing the TDM solutions for LTE-WiFi coexistence. For TDM solutions without UE suggested patterns, the UE signals the necessary information (e.g., interferer type, mode and possibly the appropriate offset) in subframes to the eNB. Based on such information, the TDM patterns (i.e., scheduling and unscheduled periods) are configured by the eNB. For TDM solution with UE suggested patterns, the UE suggests the patterns to the eNB, and the eNB must then decide the final TDM patterns. In 3GPP TR36.816 v1.0.0.1, there are two proposed TDM solutions—a Discontinuous Reception (DRX) based solution and H-ARQ process reservation based solution.

In the DRX-based solution, the UE provides the eNB with a desired TDM pattern. For example, the parameters related to the TDM pattern can consist of (1) the periodicity of the TDM pattern, and (2) the scheduled period (or unscheduled period). It is up to the eNB to decide and signal the final DRX configuration to the UE based on UE suggested TDM pattern and other possible criteria (e.g., traffic type). The timing pattern consists of On-time interval for LTE component and Off-time interval for non-LTE component. Thus, during On-time interval the LTE component transmits and receives the signal with the eNB whereas non-LTE component transmits and receives the signals with its base station (e.g., Access Point for WiFi and Master node for BT) during Off-time interval. In case of data transmission, the instance of On/Off time interval are quickly varied and allocated due to the data transmission characteristics (e.g. Data Burstiness). However current operations cannot support this quick timing interval transition because the On-time and Off-time intervals are coarsely allocated by the eNB. In addition, during the On-time interval for the LTE component, it needs to allow for the non-LTE component to transmit and receive the data if the LTE component does not occupy the On-time interval instantaneously.

In H-ARQ process reservation-based solution, a number of LTE HARQ processes or subframes are reserved for LTE operation, and the remaining subframes are used to accommodate non-LTE components (e.g., ISM and/or GNSS traffic). For example, for LTE TDD UL/DL Configuration 1, subframe #1, #2, #6 and #7 are reserved for LTE usage, and other subframes may be used for non-LTE components. The UE may not be required to receive PDCCH/PDSCH and/or transmit PUSCH/PUCCH in those subframes, depending on coexistence scenarios. It is up to the eNB to decide and signal the final time pattern to the UE based on some assistance information reported by the UE. With respect to the assistance information, the UE can indicate either:

Time offset between BT and LTE+BT configuration, or
In-device coexistence interference pattern(s), or
HARQ process reservation based pattern(s)

Since the reserved subframes can be restricted by the eNB, the eNB can restrict DL allocation/UL grants inside this time pattern. However, any restrictions set by the eNB must still be signaled to the UE in a response message, and the standards groups have not yet determined how to prevent interference with the response messages. To address this scenario, selected embodiments propose the allocation of a non-interfering downlink signaling channel which can avoid interference.

In selected embodiments, the disclosed signaling procedures provide a coexistence operation mode by defining new RRC signaling messages which are exchanged between the network and the mobile device for establishing and allocating a non-interfering downlink signaling channel that may be used by the UE device to receive interference solution instructions from the eNB device to enable coexistence operation between LTE and non-LTE components (e.g., ISM and GNSS). Alternatively, new information elements are defined which may be inserted in existing RRC messages to establish and allocate a non-interfering downlink signaling channel for receiving downlink instructions from the eNB device. Thus, there is no limitation or restriction to any particular application or messaging scheme since the functionality of the proposed messages (e.g., CoExist-REQ and CoExist-RES) could be adopted as information elements (IE) in other new or existing RRC messages (e.g., RRCConnectionReconfiguration, UEInformationRequest, RRCConnectionRequest, RRCConnectionReconfigurationComplete, RRCConnectionReestablishmentRequest, or RRCConnectionReestablishmentComplete messages). Of course, the specific names used here are for illustration only, and other names may be used to achieve the described function or outcome from the processing of the message.

Figure 2:
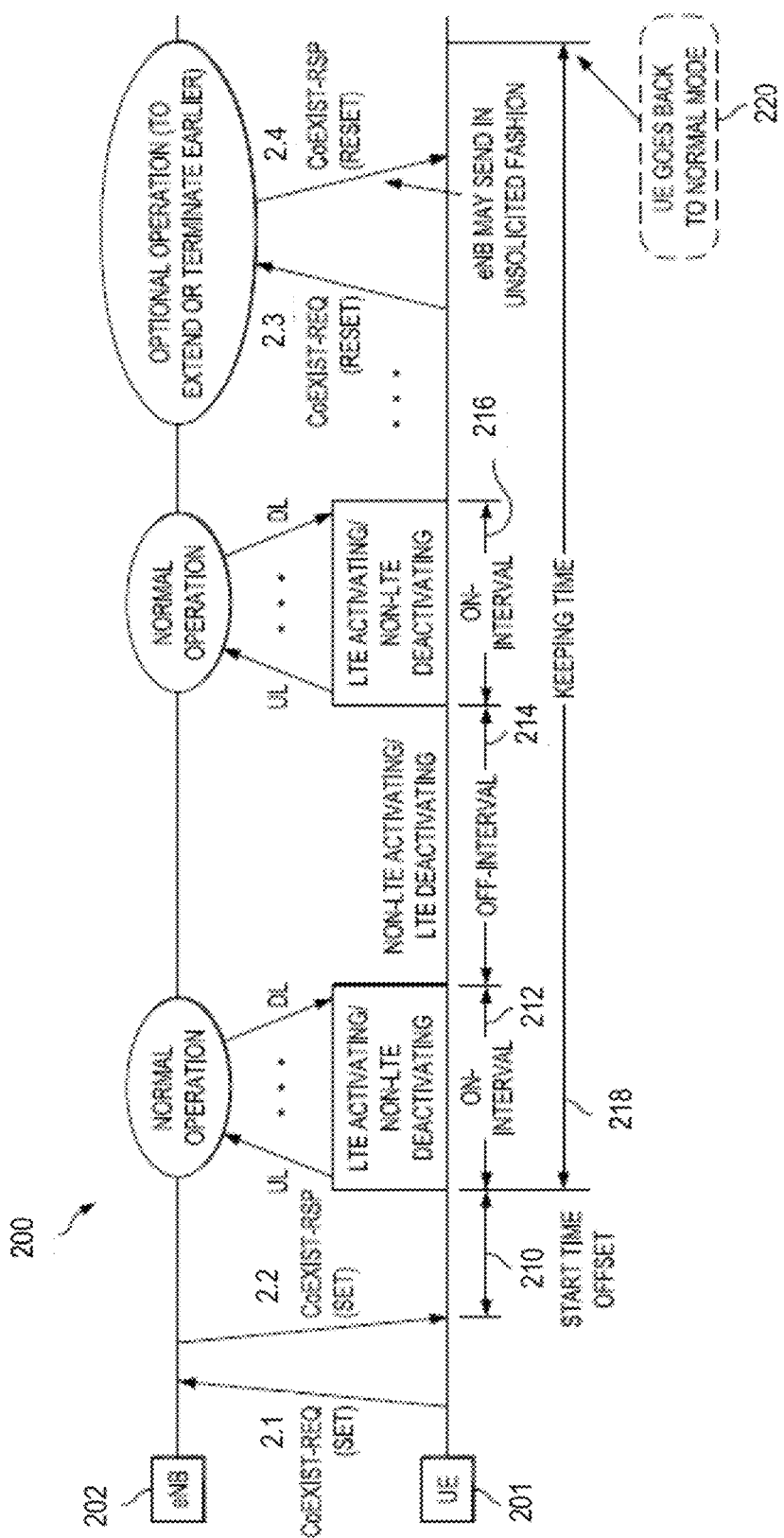
FIG. 2 is a signal flow diagram illustrating a radio resource control signaling call flow in accordance with selected embodiments.

To illustrate the role of the non-interfering downlink signaling channel, reference is now made to FIG. 2 which depicts a radio resource control signaling call flow 200 in accordance with selected embodiments wherein LTE and non-LTE components installed on a single UE device platform exchange coexistence signaling messages to separate the LTE and non-LTE signaling in time, thereby avoiding coexistence interference. On this shared platform, the LTE component on the UE 201 can know the instance when the non-LTE component is enabled, or can otherwise detect when an internal request to switch to non-LTE component is initiated. In response, the UE 201 can request coexistence mode operation by sending an indication message in an uplink transmission to the eNB 202 that in-device coexistence interference has been detected. The indication message from the UE 201 can be a simple message indicating that IDC interference has been detected, or can be a specific uplink request message (e.g., CoEXIST-REQ message 2.1) to the eNB 202 with proposed coexistence parameters. As an example, the proposed coexistence parameters may propose a Start Time Offset, Keeping Time, On-interval, Off-interval, Possible Link, and an Action field set to "1." If the LTE component at the UE 201 is coexisting with ISM components, the Possible Link parameter can be set to "Nothing" in order to ensure no coexistence interference issues. On the other hand, if the LTE component at the UE 201 is coexisting with a GNSS component, the Possible Link parameter can be set to "DL" so that the LTE component can receive messages in the DL while the GNSS component receiver is enabled. As will be appreciated, the LTE component at the UE 201 sends the request message to the eNB 202, so the LTE component must either be "on" or at least activated in an "On-interval" during coexistence mode.

The eNB 202 responds by sending a response message at signal flow 2.2 (e.g., COEXIST-RSP) in a downlink transmission to the UE 201. In general terms, the response message 2.2 may specify the chosen solution (e.g., FDM or TDM) from the eNB 202 to restore communication with the eNB in a coexistence mode of operation. In other embodiments, the response message 2.2 may include signal control parameters defining a coexistence mode of operation with a start time, end time, and alternating intervals of operation for the LTE and non-LTE components.

On reception, the eNB 202 sends a response message (Co-Exist-RSP message 2.2) back to the UE 201 in response to the request message CoExist-REQ. This response message accepts or modifies the proposed coexistence parameters from the UE's request message by returning a set of (counter-proposed) coexistence parameters defining a coexistence mode of operation with a start time, end time, and alternating intervals of operation for the LTE and non-LTE components. For example, the CoExist-RSP message may specify a Start Time Offset, Keeping Time, On-interval, Off-interval, Possible Link, and Action field set to "1." The response message 2.2 may configure the coexistence parameters as absolute or delta configuration values. With an absolute value configuration, the eNB 202 sends all related coexistence parameters in the response message 2.2, but with a delta value configuration, the eNB 202 only sends the coexistence parameters in the response message 2.2 that are different from the request message 2.1.

Based on the coexistence parameters in the response message received by the UE 201, the LTE component may enter into a coexistence operation mode, beginning at the Start Time Offset 210 and continuing until expiration at the Keeping Time 218, with alternating On-intervals 212, 216 (during which the LTE component is enabled) and Off-intervals 214 (during which the non-LTE component is enabled).

During the coexistence mode, the LTE component at the UE 201 may optionally send an update message 2.3 to the eNB 202 to request that the duration of the coexistence operation mode be extended or terminated. In selected embodiments, the update message 2.3 is a separate message (e.g., CoExistDeact-REQ message) received at the eNB 202 which seeks to deactivate or extend the coexistence operation mode, such as by terminating or extending the Keeping Time. In other embodiments, the update message uses the first request message (CoExist-REQ message) which has the Action field set to "0." In either case, the update message 2.3 may include update parameters, such as Start Time Offset and an Action field reset to "0," where the updated Start Time Offset value specifies the new end point or Keeping Time value for the coexistence operation mode.

The eNB 202 responds to the update message 2.3 by sending an update response 2.4 during an available On-interval. In selected embodiments, the update response 2.4 is a separate message (e.g., CoExistDeact-RSP message), while in other embodiments, the update message uses the first response message (CoExist-RSP message) which has the Action field reset to "0." With the update response message 2.4, the coexistence operation mode may be deactivated or extended depending on the eNB status, such as by terminating or extending the Keeping Time. And while the update response 2.4 is shown as being sent in response to the update message 2.3, the update response 2.4 may be sent in unsolicited manner without receiving an update message. For example, the update message 2.4 can be sent without solicitation if the eNB 202 determines that the coexistence operation mode requires extension or early termination. Once the Keeping Time 218 expires, the LTE component in the UE 201 and the eNB 202 may return to normal mode where the LTE component is enabled and the non-LTE component is disabled and turned-off Regardless of which specific coexistence mode of operation is specified, the eNB 202 conveys coexistence mode instructions to the UE 201 in one or more downlink instructions (e.g., CoEXIST-RSP response message 2.2 or 2.4). However, the reception of coexistence mode instructions at the UE 201 may be impaired or prevented if DL reception of LTE component is interfered by the UL transmission of non-LTE components. To illustrate how this problem can arise, reference is now made to Figure which 3 illustrates an example spectrum band allocation 300 of LTE and non-LTE components used in which a non-interfering downlink signaling channel may be allocated to avoid interference. As will be appreciated by those skilled in the art, RF filter-based solutions typically suggest at least 20 MHz band separation between LTE and non-LTE components. With this frequency separation, the LTE Band 7 307 may not induce the interference to BT channels 305 if the separation from the 20 MHz guard band 308 is enough for the isolation between two bands. However, the LTE Band 40 302 and non-LTE component in the ISM band 304 may experience the interference together due to adjacent band effect if there is not enough RF filtering. For example, a non-LTE component, such as an ISM component (BT and WiFi), can interfere with an LTE component in Band 40, meaning that DL signaling from the eNB is not guaranteed to be safely and correctly received by the UE when the non-LTE component is enabled. In the spectrum allocation 300, this is seen where a BT component operating on Channel #1 (2402-2403 MHz) in BT band 305 will experience interference with LTE Band 40 302 operating on 2382-2400 MHz. Likewise, if the WiFi component in WIFI band 306 is working on the Channel #1 (2401-2423 MHz), 2381-2400 MHz of LTE Band 40 in LTE band 302 may be interfered. Also, if the WiFi component in WIFI band 306 is working on the Channel #14 (2473-2495 MHz), 2500-2515 MHz of LTE Band 7 in LTE band 307 may give interference. As a result, there are a number of known interferable bands 303 assuming the in-device coexistence operation and band allocation in use, meaning that the UE can be aware of the specific frequency which can be interferable when the non- LTE components are enabled. It will also be appreciated that GNSS systems can also experience interference from the LTE component because GNSS systems generally operate at around 1575.42 MHz which overlaps with 2nd harmonic frequency of LTE Band 13/14, 1554-1574 MHz/1576-1596 MHz of LTE Band 13 UL (777-787 MHz) and Band 14 UL (788-798 MHz) when an LTE component transmits while in the GNSS is in the reception status.

With the illustrated spectrum band allocation 300, it can be seen that the UE may be able to successfully send an indication or request message in an uplink transmission 310 without interference from the ISM band 304, but if a response message with coexistence mode instructions is sent in a downlink transmission 311 which is subject to interference from the ISM band 304, the downlink signal 311 from the eNB may fail. To provide safe and correct DL reception from the eNB 202, a non-interfering downlink signaling channel (a.k.a., Evacuating Channel) is allocated (e.g., downlink channel 313) for use in enabling safe downlink transmission and reception of IDC-related signals when IDC interference occurs. By reserving and allocating the non-interfering downlink signaling channel in a portion of the spectrum that is sufficiently removed from the ISM band 304, coexistence mode instructions may be safely received at the UE over a downlink transmission using the allocated non-interfering downlink signaling channel. For example, a safe band 301 shown in the example spectrum band allocation 300 is a suitable location for allocating a non-interfering downlink signaling channel 313. With this arrangement, the LTE component on the in-device coexistence platform may not be required to convey to the eNB any specific operating frequency band and available channel information for the non-LTE component since the downlink signaling channel in the safe band 301 is known beforehand and established with RRC signaling during the call setup procedures.

Figure 3:
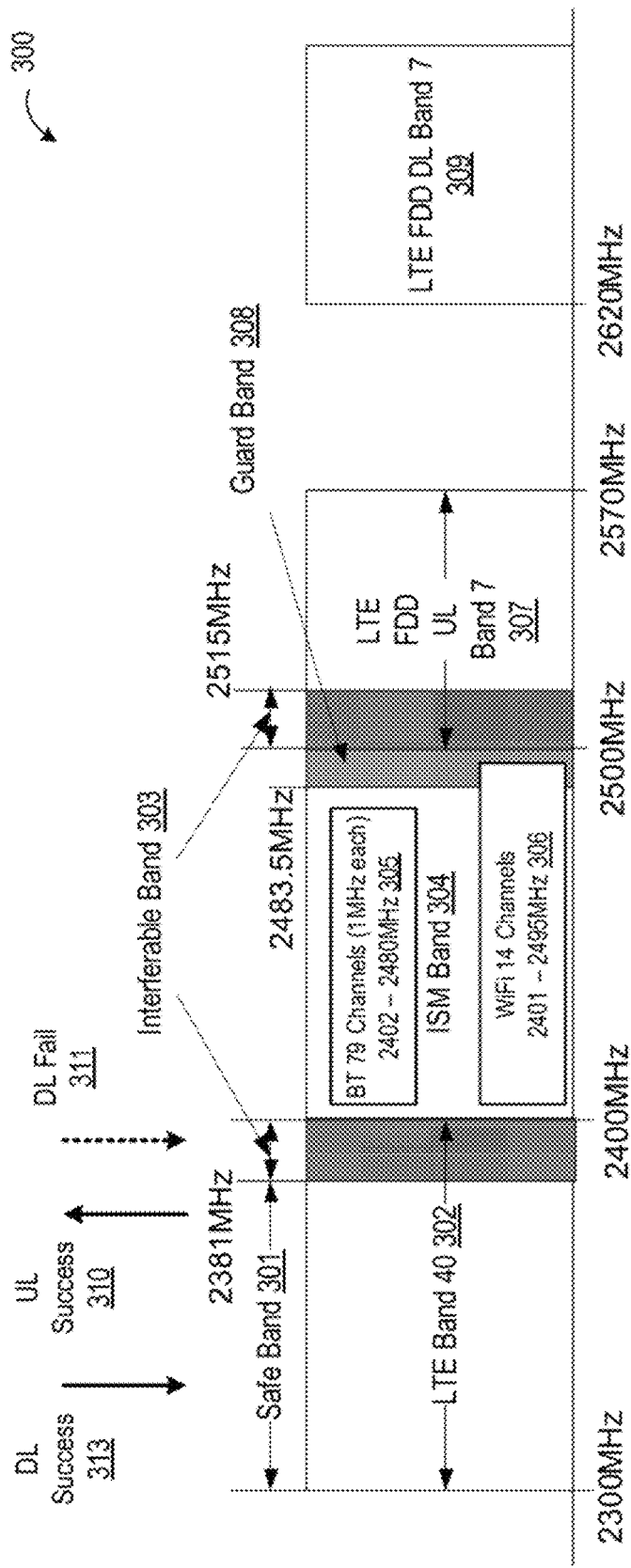
FIG. 3 illustrates an example spectrum band allocation of LTE and non-LTE components used in which a non-interfering downlink signaling channel may be allocated.

In the safe band 301, the downlink signaling channel (e.g., 313) may be used to protect the eNB's response message from the undesirable interference. In selected embodiments, the downlink signaling channel is set as a system parameter which takes into account the different radio technologies installed on the UE and their associated interference bands 303. In other embodiments, the eNB receives the operating frequency range for the LTE component and non-LTE component on the UE along with the associated interfereable frequency band (e.g., 303) based on the performance of the RF filter installed in the UE, and uses this information to determine the safe band range (e.g., 301) while another component is running. In this safe band 301, the eNB can set the frequency boundary and allocate the downlink signaling channel 313. As show in FIG. 3, the downlink signaling channel (e.g., 313) should be located far away from the interferable zone 303 to protect or minimize the interference. In addition, the downlink signaling channel may be part of a shared resource so long as there is capacity to send the appropriate message to affected UE within a short period of time.

As described herein, the downlink signaling channel (a.k.a., Evacuating Channel) may be a pre-determined specific carrier frequency for IDC operation. In selected embodiments, the eNB allocates the downlink signaling channel only to IDC UEs (e.g., UEs having both LTE and non-LTE components on a shared platform), though in other embodiments, the downlink signaling channel may be allocated to both IDC UEs and normal UEs. For eNBs which have sufficient frequency resources in a cell (e.g., more than a threshold number of frequency resources), the downlink signaling channel may be reserved and allocated to IDC UEs. However, if the frequency resources in a cell are exhausted (e.g., below a threshold number of frequency resources), the downlink signaling channel could be allocated to normal UEs which are not equipped with non-LTE components (e.g. BT, WiFi and GNSS etc.).

In allocating the downlink signaling channel, the eNB should prevent the UE from camping on the downlink signaling channel or otherwise using it for normal operation, thereby keeping the downlink signaling channel clear for reception of response messages and interference solution instructions. Of course, if the eNB has alternative frequency resources to send response messages to the IDC UEs, the eNB may allocate the downlink signaling channel to a normal UE. As a result, a normal UE can camp on the downlink signaling channel when there are no IDC UEs (or only a small number of IDC UEs) in a cell or when the eNB allocates the downlink signaling channel to the normal UE.

Once the UE receives the response message at the downlink signaling channel, the received interference solution instructions will guide the operation of the UE. In some embodiments, the interference solution instructions received at the downlink signaling channel will cause the UE to move to another frequency or channel after taking any solution (FDM or TDM) on the downlink signaling channel. In other embodiments, the UE may return to the previous frequency which was interfered by non-LTE component after taking TDM solution on the downlink signaling channel. In still further embodiments, the UE may stay on the downlink signaling channel if the downlink signaling channel is not highly loaded.

Figure 4:
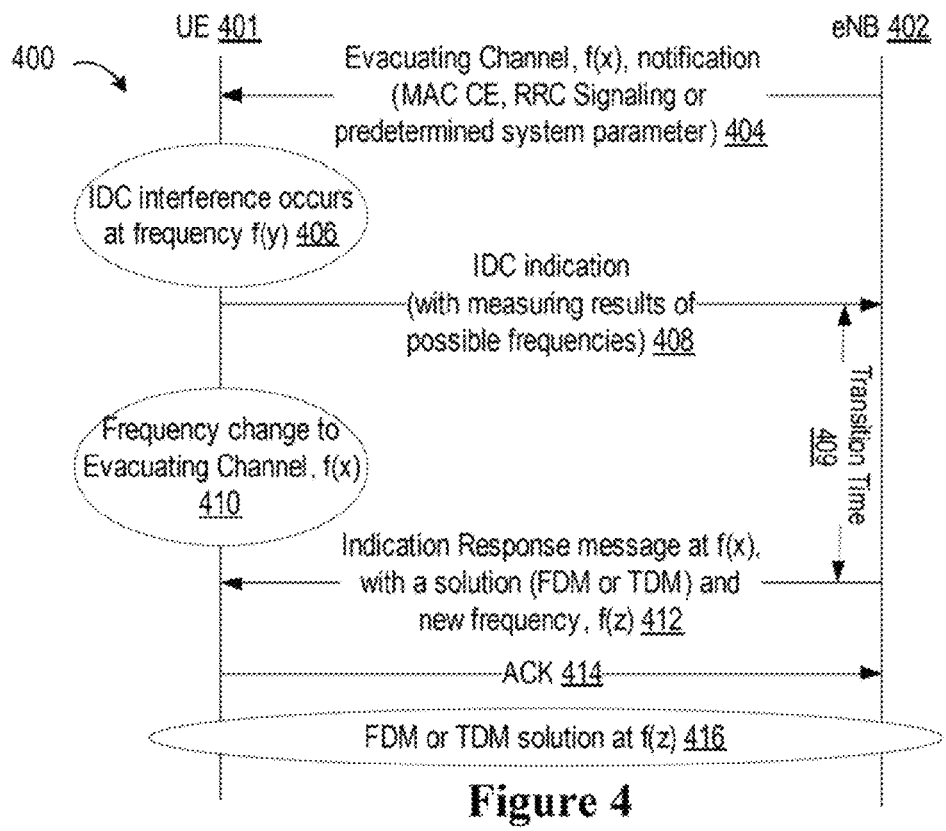
FIG. 4 is a signal call flow diagram illustrating the sequential movement of a UE from a first channel through a non-interfering downlink signaling channel to a second channel in accordance with selected embodiments.

To illustrate the operation of the process for using a downlink signaling channel, reference is made to FIG. 4 which depicts the call flow diagram 400 illustrating the sequential movement of the UE 401 and eNB 402 from a first channel f(y) through a non-interfering downlink signaling channel f(x) to a second channel f(z) in accordance with selected embodiments. As depicted, the UE 401 which is equipped with LTE and non-LTE components in the same platform receives a notification message 404 from the eNB 402 which specifies the downlink signaling channel f(x). As will be appreciated, the notification message 404 and downlink signaling channel can be permanently set as a system parameter such that the downlink signaling channel is predetermined as a permanent frequency band for the IDC UE. Alternatively, the notification message 404 and downlink signaling channel can be flexibly set with one or more RRC signaling messages or broadcast messages such as SIBs. This flexibility allows the downlink signaling channel to be set according to cell loading or frequency usage so that a downlink signaling channel can be temporarily reserved for the IDC UEs in a cell, but otherwise not reserved if there are no IDC UEs in a cell.

In selected embodiments, the notification message(s) 404 sent by the eNB 402 should reflect an allocation whereby the non-interfering downlink signaling channel f(x) is available for all IDC UEs in a cell. Of course, if there are no IDC UEs in a cell or if the non-interfering downlink signaling channel f(x) is rarely used, the eNB 402 may allocate the non-interfering downlink signaling channel f(x) to normal UEs. In situations where the non-interfering downlink signaling channel f(x) overloaded and there is no available resource for an IDC UE 401, the eNB 402 may selectively accept a request from the IDC UE 401 based on its priority (e.g. grade of UE) or QoS requirements.

Once in-device coexistence interference occurs (step 406), the UE 401 sends an IDC indication message 408 (e.g., RRC signaling message) to the eNB 402 indicating that there is in-device coexistence interference. At this point, the UE 401 is operating at a first or original frequency f(y) when IDC interference from non-LTE components is detected or scheduled, and is requesting that a new frequency f(z) be allocated at the downlink signaling channel f(x). At this point, the UE 401 may be configured to measure and report information about frequencies that are available or unavailable for use with the UE 401 so that the eNB 402 has an accurate understanding of the conditions at the UE 401. For example, the UE 401 may report which frequencies are available and/or not available for use by the UE 401 based on detected interference conditions. With this information, the eNB 402 is able to make more intelligent allocation decisions by eliminating the UE's unavailable frequencies as well as any of the UE's available frequencies that cannot be used due to overload or any other scheduling problem at the eNB 402. From point of UE, therefore, any possible or impossible frequencies may be reported to the eNB 402 in with the IDC indication message 408 to allow more flexible and intelligent channel allocations.

Subsequently at step 410, the UE 401 changes the working frequency channel, f(y), to the downlink signaling channel f(x) to receive a response message from the eNB 402 which will include interference solution instructions (e.g., FDM or TDM) and possibly also a new frequency f(z). Since the downlink signaling channel f(x) was previously established or allocated (e.g., via notification message 404), the UE is programmed to receive the response message 412 at the downlink signaling channel f(x) which will specify a second or new frequency f(z).

Once the UE 401 receives the IDC indication response message 412 from the eNB 402, the UE 401 sends an ACK message 414 to the eNB 402 to confirm the resource allocation (FDM/TDM and new frequency f(z)). In this case, ACK message could be HARQ-ACK message or L3 RRC message. After acknowledging receipt of the response message 412 (with ACK message 414), the UE 401 and eNB 402 can resume normal operation using the FDM or TDM solution at f(z) at step 416.

By using the downlink signaling channel f(x) to convey a allocated frequency f(z) for communications between the UE 401 and eNB 402, the eNB 402 prevents the UE 401 from occupying the downlink signaling channel f(x). In selected embodiments, the allocated frequency f(z) may be a new frequency so that the UE 410 moves to another, different frequency or channel after taking any solution (FDM or TDM) from the response message 412 on the downlink signaling channel f(x). Alternatively, the allocated frequency f(z) may be the previous IDC interfered frequency f(y) so that the UE 401 moves back to the previous frequency which was interfered by non-LTE component after taking TDM solution from the response message 412 on the downlink signaling channel f(x). Alternatively, the allocated frequency f(z) may be the downlink signaling channel f(x) so that the UE 401 stays on the downlink signaling channel if it is not highly loaded.

As shown in FIG. 4, the UE 401 may be programmed to receive the response message 412 within a certain transition time 409 at the downlink signaling channel f(x) which will specify a second or new frequency f(z). In selected embodiments, the transition time 409 for moving time from the interfered channel f(y) to the downlink signaling channel f(x) defines a maximum or time-out value for determining if the UE 401 receives a timely indication response message 412. If the UE 401 does not receive the IDC response message 412 from the eNB 402 before expiration of the transition time 409, the UE 401 may be configured to assume that the IDC indication message 408 was not correctly received over the downlink signaling channel f(x) by the eNB. In this case, the UE 401 may be configured to return back to the original frequency f(y) to re-send the IDC indication message 408, and the process repeats. Alternatively, the UE 401 may instead send the IDC indication message one or more times over the downlink signaling channel f(x) instead of going back to the original frequency f(y).

As an alternative to having the UE 401 move directly to the downlink signaling channel f(x) after detecting in-device coexistence interference, the UE 401 may instead be configured to wait for a predetermined time period before moving to the downlink signaling channel f(x). In selected embodiments, the UE 401 moves to the downlink signaling channel f(x) if the IDC response message 412 is not received before expiration of a timer which is initiated when the UE sends the first IDC indication 408, where the timer value may be defined as a system parameter or otherwise configured in the notification message 404. Alternatively, the UE 401 may be configured to move to the downlink signaling channel f(x) if a threshold number of IDC indication message transmissions 408 are sent without receiving an IDC response message 412, where the threshold may be defined as a system parameter or otherwise configured in the notification message 404. After the UE 401 moves to downlink signaling channel f(x), the UE 401 can send another IDC indication message or otherwise confirm that it has moved to the downlink signaling channel f(x). In response, the eNB 402 can allocate a new frequency, f(z), with FDM or TDM solution using an IDC response message, or can let the UE 401 stay at the downlink signaling channel f(x) by allowing normal data service to be resumed without sending an IDC response message.

To recover from errors that can arise when the UE 401 moves in sequence from one channel f(y) to another f(z) via the downlink signaling channel f(x), there are error recovery schemes proposed for both the UE 401 and the eNB 402.

At the UE 401, the IDC indication message 408 may be sent several times to the eNB 402 at the original frequency f(y). If the UE 401 does not receive a response message 412 at the downlink signaling channel f(x) which contains interference avoidance instructions (e.g., FDM/TDM and a new frequency f(z)) within a predetermined transition time 409, the UE 401 may be configured to go back to the original frequency f(y) to re-send the IDC indication message 408 to the eNB 402. At this time, the UE 401 may send the IDC indication message 408 one or more times at the original frequency f(y), and then return to the downlink signaling channel f(x) for DL reception (e.g. IDC indication response message) from the eNB 402. Alternatively, the UE 401 may send the IDC indication message 408 one or more times at the downlink signaling channel f(x) instead of going back to the original frequency f(y). Alternatively, the UE 401 may declare a radio link failure (RLF) situation and try to reselect the cell.

At the eNB 402, error recovery may be supported by configuring the eNB 402 to return back to the original frequency f(y) to wait for an IDC indication message 408 if the eNB 402 does not receive an ACK message 414 from the UE 401 at the downlink signaling channel f(x) within a specified time. If the eNB 402 receives the IDC indication message at the original frequency f(y), it may follow the normal procedures shown in FIG. 4. But if no IDC indication message is received, the eNB 402 may not attempt to distribute interference solution instructions.

Figure 5:
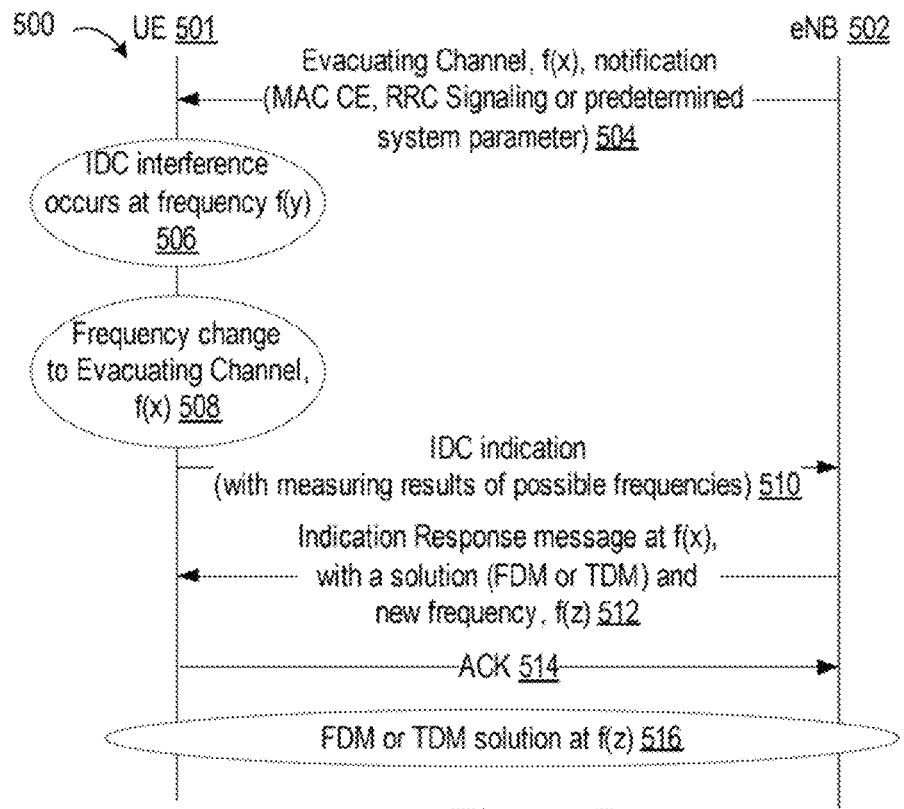
FIG. 5 is a signal call flow diagram illustrating the whole movement of a UE from a first channel through a non-interfering downlink signaling channel to a second channel in accordance with alternate embodiments.

To illustrate another example operation of the process for using a downlink signaling channel, reference is made to FIG. 5 which depicts the call flow diagram 500 illustrating the whole movement of the UE 501 and eNB 501 from a first channel f(y) through a non-interfering downlink signaling channel f(x) to a second channel f(z) in accordance with selected embodiments. As depicted, the UE 501 is equipped with LTE and non-LTE components in the same platform and receives a notification message 504 from the eNB 502 which specifies the downlink signaling channel f(x) in a notification message 504, either as a permanent system parameter or via one or more RRC signaling messages or broadcast messages which allow the downlink signaling channel to be flexibly set according to cell loading or frequency usage. Again, the non-interfering downlink signaling channel f(x) may be allocated so that is available for all IDC UEs in a cell, or may be allocated to normal UEs if there are no IDC UEs in a cell or if the non-interfering downlink signaling channel f(x) is rarely used, or may be selectively allocated to an IDC UE 401 based on its priority (e.g. grade of UE) or QoS requirements in cases where the non-interfering downlink signaling channel f(x) overloaded.

At step 506, the UE 501 detects the existence of in-device coexistence interference at the first or original frequency f(y) and at step 508, the UE 501 changes the working frequency channel, f(y), to the downlink signaling channel f(x) to receive a response message from the eNB 502 which may include interference solution instructions (e.g., FDM or TDM) and possibly also a new frequency f(z). Since the downlink signaling channel f(x) was previously established or allocated (e.g., via notification message 504), the UE may be programmed to move to the downlink signaling channel f(x) which for reception of an indication response message 512 which may specify a second or new frequency f(z).

At step 510, the UE 501 sends an IDC indication message 510 (e.g., RRC signaling message) to the eNB 502 indicating that there is in-device coexistence interference, thus reversing the sequence of steps 406, 408 shown in FIG. 4. After the channel change, the UE 501 is operating at the downlink signaling channel f(x), and is requesting that a new frequency f(z) be allocated at the downlink signaling channel f(x). At this point, the UE 501 may be configured to measure and report information about frequencies that are available or unavailable for use with the UE 501 so that the eNB 502 has an accurate understanding of the conditions at the UE 501 and can make more intelligent allocation decisions by eliminating the UE's unavailable frequencies as well as any of the UE's available frequencies that cannot be used due to overload or any other scheduling problem.

After moving to the downlink signaling channel f(x), the UE 5011 may send a scheduling request message (not shown) to the eNB 502 on the signaling channel f(x). Upon receiving a UL grant message (not shown) from the eNB 502 on the signaling channel f(x), the UE 501 transmits the IDC indication message 510 to the eNB 502 at the signaling channel f(x). In view of this possibility, the eNB 502 should monitor the signaling channel f(x) to check for UL signals from the UE 501. Sending of scheduling request message and receiving of UL grant message could be done before sending the IDC indication message 510.

Once the UE 501 receives the IDC indication response message 512 from the eNB 512, the UE 501 sends an ACK message 514, such as a HARQ-ACK message or L3 RRC message, to confirm the resource allocation (FDM/TDM and new frequency f(z)). Thereafter, the UE 501 and eNB 501 can resume normal operation using the FDM or TDM solution at f(z) at step 516.

In the example shown in FIG. 5, the eNB 502 may have load information about the other UEs in its cell and the associated frequency channels used by same. With this information, the eNB 502 can allocate the data and downlink signaling channel(s) to avoid the need for multiple channel changes by the UEs 501. For example, the eNB 502 could use the notification messages 504 to direct the IDC UE 501 to an alternative downlink signaling channel f(z) if the primary downlink signaling channel f(x) is already crowded. In addition or in the alternative, the eNB 502 could change the notification messages 504 so that, for new UEs, the primary downlink signaling channel f(x) is changed to a new primary downlink signaling channel f(z) when the eNB 502 determines that the primary downlink signaling channel f(x) is overcrowded. In this way, new IDC UEs that have not been allocated to channel f(x) will go to channel f(z), while the old IDC UEs continue to operate with the channel f(x). If for any reason there is a requirement that every IDC UE must discontinue use of the primary downlink signaling channel f(x), the eNB 502 can send out an appropriate announcement or broadcast message.

To recover from errors that can arise when the UE 501 moves wholly from one channel f(y) to another f(z) via the downlink signaling channel f(x), there are error recovery schemes proposed for both the UE 501 and the eNB 502.

At the UE 501, the UE 501 may be configured to send the IDC indication message 510 several times to the eNB 502 at the downlink signaling channel f(x). If the UE 501 does not receive a response message 512 at the downlink signaling channel f(x) which contains interference avoidance instructions (e.g., FDM/TDM and a new frequency f(z)) within a specified time, the UE 501 may be configured to re-send the IDC indication message 510 one or more times on the downlink signaling channel f(x). Alternatively, the UE 501 may declare a radio link failure (RLF) situation and try to reselect the cell.

At the eNB 502, error recovery is supported by configuring the eNB 502 to monitor the downlink signaling channel f(x) if the eNB 402 does not receive an ACK message 514 from the UE 501 at the downlink signaling channel f(x) within a specified time. Alternatively, the eNB 502 may re-send an IDC indication response message 512 with resources allocation (FDM/TDM and new frequency) and then wait the ACK message 514 again.

An EC indication message could be newly created to indicate the downlink signaling channel information (a.k.a., Evacuating Channel) to the in-device coexistence device. But existing RRC message or MAC CE method could be used for this purpose if the same information elements are added on the message. Attached at the Appendix is an example message structure including proposed changes to the existing RRCConnectionReconfiguration message in TS36.331 for allocating non-interfering downlink signaling channel, though other existing messages could also be used with similar logic modifications.

By now it should be appreciated that there is disclosed herein methods for use in a radio access network (eNB) by user equipment (UE) having a first radio technology component (e.g., an LTE component) and a second radio technology component (e.g., a GNSS or ISM) on a single platform. In addition, computer program products are disclosed that include a non-transitory computer readable storage medium having computer readable program code embodied therein with instructions which may be adapted to be executed to implement a method for operating user equipment (UE) and/or a radio access network (eNB) in a coexistence mode, substantially as described hereinabove. In disclosed systems, methods, and computer program products, a frequency allocation scheme is provided for receiving response message from the radio access network over an allocated downlink signaling channel for the in-device coexistence system in both sequential moving and whole moving embodiments. The downlink signaling channel is allocated to provide safe UL transmission and DL reception at the user equipment when IDC interference occurs by being positioned far from the potentially interfering frequency range (e.g., ISM band) and safe from IDC interference. Whether set as a system parameter or flexibly set with RRC signaling messages, the downlink signaling channel is the channel for conveying interference solutions from the radio network once the user equipment detects and/or signals the existence of IDC interference. The downlink signaling channel may also be used with various error recovery schemes to provide for more robust exchange of IDC indication and response messages.

Figure 6:
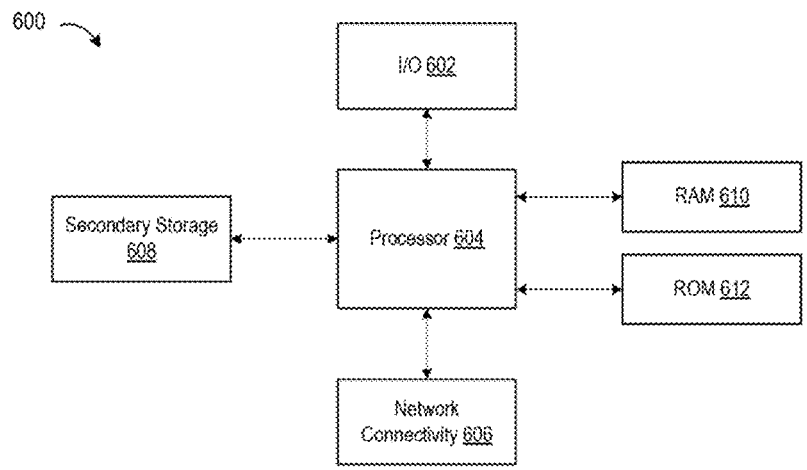
FIG. 6 illustrates an example computer system that may be suitable for implementing the in-device coexistence interference at a user device or network node.

The user devices and network elements described herein may include any general or special purpose computer with sufficient processing power, memory resources, and network throughput capability to handle the necessary workload placed upon it. FIG. 6 illustrates an example computer system 600 that may be suitable for implementing one or more embodiments disclosed herein. The computer system 600 includes a processor 604 (which may be referred to as a central processor unit or CPU) that is in communication with input/output (I/O) devices 602, network connectivity devices 606, an optional secondary storage 608, random access memory (RAM) 610, and read only memory (ROM) 612. The processor may be implemented as one or more CPU chips.

The secondary storage 608 is optionally included, and typically includes one or more disk drives or tape drives used for non-volatile storage of data and/or for over-flow data storage device if RAM 610 is not large enough to hold all working data. Secondary storage 608 may be used to store programs which are loaded into RAM 610 when such programs are selected for execution. The ROM 612 is used to store instructions and perhaps data which are read during program execution. ROM 612 is a non-volatile memory device which typically has a small memory capacity relative to the larger memory capacity of secondary storage. The RAM 610 is used to store volatile data and perhaps to store instructions. Access to both ROM 612 and RAM 610 is typically faster than to secondary storage 608.

I/O devices 602 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 606 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 606 devices may enable the processor 604 to communicate with an Internet or one or more intranets. With such a network connection, it is contemplated that the processor 604 might receive information from the network, or might output information to the network in the course of performing the above-described method steps. Such information, which is often represented as a sequence of instructions to be executed using processor 604, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 604 for example, may be received from and outputted to the network, for example, in the form of a computer data baseband signal or signal embodied in a carrier wave. The baseband signal or signal embodied in the carrier wave generated by the network connectivity 606 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 604 executes instructions, codes, computer programs, scripts which it accesses from hard disk, floppy disk, optical disk (these various disk-based systems may all be considered secondary storage 608), ROM 612, RAM 610, or the network connectivity devices 606. While only one processor 604 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 7:
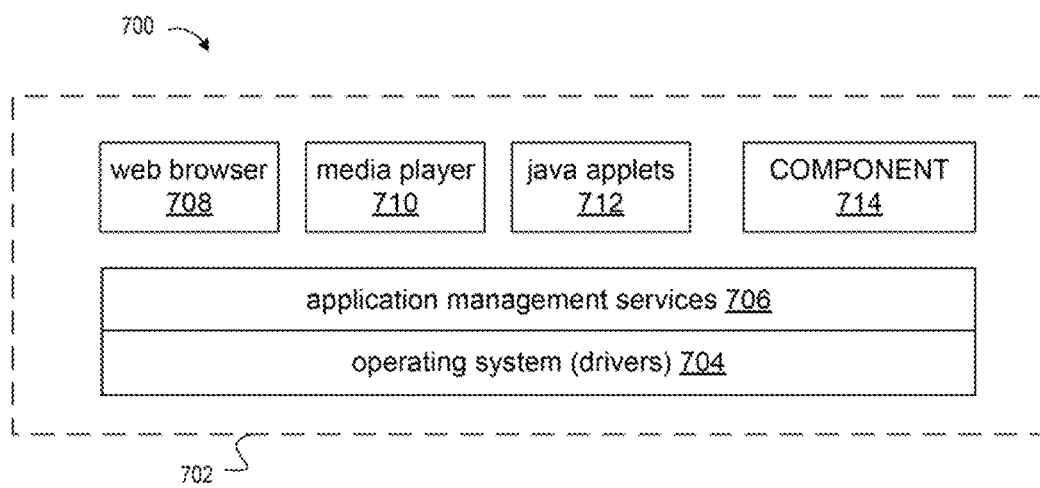
FIG. 7 is a diagram of a software environment that may be implemented on a user agent and/or network node operable for some of the various embodiments of the disclosure.

FIG. 7 is a diagram of a software environment 700 that may be implemented on a communication device and/or network node operable for some of the various embodiments of the disclosure. As illustrated, one or more processing resources at the communication device or network node execute operating system drivers 704 that provide a platform from which the rest of the software operates. The operating system drivers 704 provide drivers for the device hardware with standardized interfaces that are accessible to application software. The operating system drivers 704 include application management services ("AMS") 706 that transfer control between applications running on the device. In UE instances, the software environment 702 includes a web browser application 708, a media player application 710, and Java applets 712 are provided as device applications. The web browser application 708 configures the UE device to operate as a web browser, allowing a user to enter information into forms and select links to retrieve and view web pages. The media player application 710 configures the UE to retrieve and play audio or audiovisual media. The Java applets 712 configure the UE device to provide games, utilities, and other functionality. Finally, the component 714 may provide the in-device coexistence interference management functionality described herein.

Figure 8:
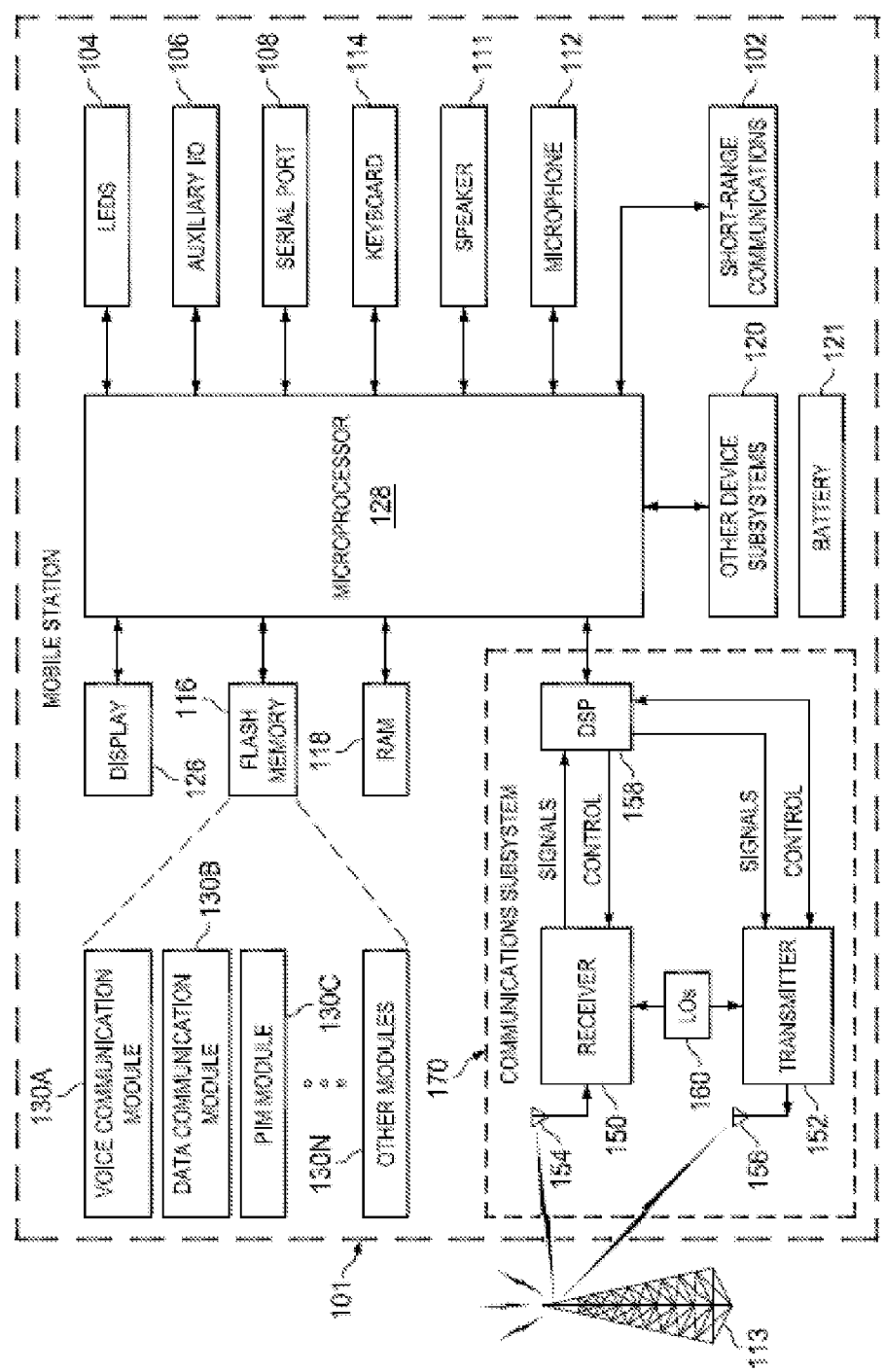
FIG. 8 is a schematic block diagram illustrating exemplary components of a mobile wireless communications device which may be used with selected embodiments.

Referring now to FIG. 8, there is shown a schematic block diagram illustrating exemplary components of a mobile wireless communications device 101 which may be used with selected embodiments. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary device 106, such as a touchpad, a rocker switch, a thumbwheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein methods for use in user equipment (UE) devices comprising a first radio technology component (e.g., an LTE component) and a second radio technology component (e.g., a GNSS or ISM component) on a single platform. In disclosed systems and methodologies, the UE may detect in-device coexistence interference at a radio component at a first channel frequency. At the radio component, the IDC interference can be detected by receiving an internal message that a second radio component is or will be enabled, or by receiving an internal message identifying a transmission frequency band being used by a second radio component, or by measuring in-device coexistence interference from a second radio component. The UE device may then send a coexistence interference indication message to a radio access network. At this time, the UE device may also identify one or more available (or unavailable) channel frequencies at the user equipment device and including identifying information for the available (or unavailable) channel frequencies in the coexistence interference indication message. The UE device may then receive a response message at a downlink signaling channel frequency that is different from first channel frequency, where the response message includes one or more control parameters for establishing a second channel frequency for the radio component. In selected embodiments, the downlink signaling channel frequency is specified as a system parameter which defines a frequency band which is not experiencing in-device coexistence interference, but in other embodiments, an Radio Resource Control (RRC) message (e.g., RRCConnectionReconfiguration) sent by the radio network is used to define the downlink signaling channel frequency as a non-interfering frequency band which is not interfered by a second radio component. In other embodiments, the downlink signaling channel frequency is displaced from an Industrial, Science and Medical (ISM) frequency band by at least a predetermined interference band. Using the control parameters, the UE device enables the radio component to use the second channel frequency which may be different from or the same as the downlink signaling channel frequency.

In addition, there is disclosed methods for use in radio access network (eNB) to avoid interference between first and second radio components located on a single platform at a user equipment (UE). In disclosed methodologies, the eNB may receive a coexistence interference indication message indicating the existence at a first radio component of in-device coexistence interference at a first channel frequency caused by a second radio component, and may subsequently send a response message at a downlink signaling channel frequency that is different from first channel frequency, where the response message comprises one or more control parameters for establishing a second channel frequency for the first radio component. The eNB may also send a Radio Resource Control (RRC) message (e.g., RRCConnectionReconfiguration message) which specifies the downlink signaling channel frequency to the UE. As an error recovery operation, the eNB may return to the first channel frequency to receive a second coexistence interference indication message if an acknowledge (ACK) message to the response message is not received within a predetermined time period.

In another form there is disclosed computer program products implemented as a non-transitory computer readable storage medium having computer readable program code embodied therein that may be adapted to be executed to implement a method for operating user equipment (UE) in a coexistence mode. As disclosed, the computer program products may include instructions for detecting at the first radio component in-device coexistence interference from the second radio component at a first channel frequency, and then sending a coexistence interference indication message to a radio access network. In addition, the computer program products may include instructions for receiving a response message at a downlink signaling channel frequency that is different from first channel frequency, where the response message comprises one or more control parameters for establishing a second channel frequency for the first radio component. The computer program products may also include instructions for enabling the first radio component with the one or more control parameters to use the second channel frequency without interference to/from the second radio component.

In yet another form, there is disclosed user equipment devices having a first radio technology component (e.g., an LTE component) and a second radio technology component (e.g., a GNSS or ISM component) and method for operating same. As disclosed, the UE device may include processor control logic and/or circuitry configured to provide a preferred frequency notification for the first radio component to avoid in-device coexistence interference from the second radio component by detecting at the first radio component in-device coexistence interference at a first channel frequency, and then sending a coexistence interference indication message to a radio access network. The processor control logic and/or circuitry then cause the UE device to receive a response message at a downlink signaling channel frequency that is different from first channel frequency, where the response message comprises one or more control parameters for establishing a second channel frequency for the first radio component.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a coexistence operation mode whereby different signaling components are separated in time to avoid coexistence interference, the embodiments are not necessarily limited to the example embodiments which illustrate inventive aspects that are applicable to a wide variety of signaling schemes and applications. Thus, the particular embodiments disclosed above are illustrative only and should not be taken as limitations, as there may be modifications and practices in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope as defined by the appended claims so that those skilled in the art should understand that they can make various changes, substitutions and alterations without departing from the spirit and scope in its broadest form.

APPENDIX

This appendix sets forth proposed changes to selected 3GPP TS reports and specifications that relate to the management and avoidance of in-device coexistence interference.

APPENDIX

TS 36.331 - Change for RRCConnectionReconfiguration Message for Allocating Non-Interfering Downlink Signaling Channel.

```
======================================Begin of Change======================================
RRCConnectionReconfiguration message
    Signalling radio bearer: SRB1
    RLC-SAP: AM
    Logical channel: DCCH
    Direction: E-UTRAN to UE
RRCConnectionReconfiguration ::=        SEQUENCE {
    rrc-TransactionIdentifier               RRC-TransactionIdentifier,
    criticalExtensions                      CHOICE {
        c1                                      CHOICE{
            rrcConnectionReconfiguration-r8         RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                SEQUENCE { }
    }
}
RRCConnectionReconfiguration-r8-IEs ::= SEQUENCE {
    measConfig                          MeasConfig                              OPTIONAL,   -- Need ON
    mobilityControlInfo                 MobilityControlInfo                     OPTIONAL,   -- Cond HO
    dedicatedInfoNASList                SEQUENCE (SIZE(1..maxDRB)) OF
                                            DedicatedInfoNAS                    OPTIONAL,   -- Cond nonHO
    radioResourceConfigDedicated        RadioResourceConfigDedicated            OPTIONAL,   -- Cond HO-toEUTRA
    securityConfigHO                    SecurityConfigHO                        OPTIONAL,   -- Cond HO
    nonCriticalExtension                RRCConnectionReconfiguration-v890-IEs       OPTIONAL
}
RRCConnectionReconfiguration-v890-IEs ::= SEQUENCE {
    lateR8NonCriticalExtension          OCTET STRING                            OPTIONAL,   -- Need OP
    nonCriticalExtension                RRCConnectionReconfiguration-v920-IEs       OPTIONAL
}
RRCConnectionReconfiguration-v920-IEs ::= SEQUENCE {
    otherConfig-r9                      OtherConfig-r9                          OPTIONAL,   -- Need ON
    fullConfig-r9                       ENUMERATED {true}                       OPTIONAL,   -- Cond HO-Reestab
    nonCriticalExtension                SEQUENCE { }                            OPTIONAL    -- Need OP
}
RRCConnectionReconfiguration-r10-IEs ::= SEQUENCE {
    measConfig                          MeasConfig                              OPTIONAL,   -- Need ON
    mobilityControlInfo                 MobilityControlInfo                     OPTIONAL,   -- Cond HO
    dedicatedInfoNASList                SEQUENCE (SIZE(1..maxDRB)) OF
                                            1 DedicatedInfoNAS                  OPTIONAL,   -- Cond nonHO
    radioResourceConfigDedicated        RadioResourceConfigDedicated            OPTIONAL,   -- Cond HO-toEUTRA
    securityConfigHO                    SecurityConfigHO                        OPTIONAL, -- Cond HO
    In-DeviceCoexistenceECallocation    In-deviceCoexistenceECallocation OPTIONAL, -- Cond HO
    nonCriticalExtension                RRCConnectionReconfiguration-v890-IEs       OPTIONAL
}
SecurityConfigHO ::=                    SEQUENCE {
    handoverType                            CHOICE {
        intraLTE                                SEQUENCE {
            securityAlgorithmConfig                 SecurityAlgorithmConfig     OPTIONAL,   -- Cond fullConfig
            keyChangeIndicator                      BOOLEAN,
            nextHopChainingCount                    NextHopChainingCount
        },
        interRAT                                SEQUENCE {
            securityAlgorithmConfig                 SecurityAlgorithmConfig,
            nas-SecurityParamToEUTRA                OCTET STRING (SIZE(6))
        }
    },
    ...
}
-- ASN1STOP
======================================End of Change======================================
```

What is claimed is:

1. A method for use in user equipment (UE) device, comprising:
    detecting at a radio component in-device coexistence interference at a first channel frequency;
    determining one or more unavailable channel frequencies in addition to the first channel frequency;
    sending a coexistence interference indication message to a radio access network, wherein the coexistence interference indication message requests allocation of a frequency different from the first channel frequency and the one or more unavailable channel frequencies; and
    receiving a response message at a downlink signaling channel frequency that is different from first channel frequency, where the response message comprises one or more control parameters for establishing a second channel frequency for the radio component that is different from the first channel frequency and the one or more unavailable channel frequencies.

2. The method of claim 1 where the radio component comprises an LTE component, and in-device coexistence information is caused by a second radio component comprising a Global Navigation Satellite System (GNSS) component or a component operating in an Industrial, Science and Medical (ISM) frequency band.

3. The method of claim 1, further comprising:
    enabling the radio component to use the second channel frequency based on the one or more control parameters.

4. The method of claim 1, where detecting in-device coexistence interference comprises receiving an internal message that a second radio component is enabled.

5. The method of claim 1, where detecting in-device coexistence interference comprises receiving an internal message identifying a transmission frequency band being used by a second radio component.

6. The method of claim 1, where detecting in-device coexistence interference comprises measuring at the radio component in-device coexistence interference from a second radio component.

7. The method of claim 1, where the downlink signaling channel frequency is specified as a system parameter which defines a frequency band which is not experiencing in-device coexistence interference.

8. The method of claim 1, where the downlink signaling channel frequency is specified in a Radio Resource Control (RRC) message sent by the radio access network or as a system information block broadcast by the radio access network.

9. The method of claim 8, where the RRC message comprises at least one of an RRCConnectionReconfiguration message, a UEInformationRequest message, an RRCConnectionRequest message, an RRCConnectionReconfigurationComplete message, an RRCConnectionReestablishmentRequest message, an RRCConnectionReestablishmentComplete message and a new RRC message to specify the downlink signaling channel frequency for the radio component.

10. The method of claim 1, where the downlink signaling channel frequency is displaced from an Industrial, Science and Medical (ISM) frequency band by at least a predetermined interference band.

11. The method of claim 1, where the second channel frequency for the radio component is the downlink signaling channel frequency.

12. The method of claim 1, where the coexistence interference indication message is sent at the first channel frequency before changing to the downlink signaling channel frequency to receive the response message.

13. The method of claim 1, further comprising sending the coexistence interference indication message a plurality of times.

14. The method of claim 1, further comprising resending the coexistence interference indication message one or more times if a response message is not received at the downlink signaling channel frequency within a predetermined transition time period.

15. The method of claim 1, further comprising sending the coexistence interference indication message one or more times at the downlink signaling channel frequency if a response message is not received at the downlink signaling channel frequency within a predetermined transition time period.

16. The method of claim 1, further comprising changing to the downlink signaling channel frequency in connection with sending the coexistence interference indication message.

17. The method of claim 1, further comprising declaring a radio link failure if a response message is not received within a predetermined transition time period.

18. A method for use in radio access network (eNB) to reduce interference between first and second radio components located on a single platform at a user equipment (UE), comprising:
    receiving a coexistence interference indication message indicating the existence at a first radio component of in-device coexistence interference at a first channel frequency caused by a second radio component, wherein the coexistence interference indication message requests allocation of a frequency;
    sending a response message, using a downlink signaling channel frequency that is different from the first channel frequency, where the response message comprises one or more control parameters for establishing a second channel frequency for the first radio component that is different from the first channel frequency and the one or more unavailable channel frequencies.

19. The method of claim 18, wherein sending a response message comprises sending a Radio Resource Control (RRC) message or broadcasting a system information block which specifies the downlink signaling channel frequency to the UE.

20. The method of claim 19, where the RRC message comprises at least one of an RRCConnectionReconfiguration message, a UEInformationRequest message, an RRCConnectionRequest message, an RRCConnectionReconfigurationComplete message, an RRCConnectionReestablishmentRequest message, an RRCConnectionReestablishmentComplete message and a new RRC message to specify the downlink signaling channel frequency.

21. The method of claim 18, further comprising:
    returning to the first channel frequency to receive a second coexistence interference indication message if an acknowledge (ACK) message to the response message is not received on the downlink signaling channel frequency within a predetermined time period.

22. The method of claim 18, further comprising:
    resending the response message if an acknowledge (ACK) message to the response message is not received within a predetermined time period.

23. A computer program product comprising a non-transitory computer readable storage medium having computer readable program code embodied therein, said computer readable program code adapted to be executed to implement a method for operating user equipment (UE) in a coexistence mode, comprising:
- instructions for detecting at a first radio component in-device coexistence interference from a second radio component at a first channel frequency;
- instructions for determining one or more unavailable channel frequencies in addition to the first channel frequency;
- instructions for sending a coexistence interference indication message to a radio access network, wherein the coexistence interference indication message requests allocation of a frequency different from the first channel frequency and the one or more unavailable channel frequencies;
- instructions for receiving a response message at a downlink signaling channel frequency that is different from first channel frequency, where the response message comprises one or more control parameters for establishing a second channel frequency for the first radio component that is different from the first channel frequency and the one or more unavailable channel frequencies; and
- instructions for enabling the first radio component with the one or more control parameters to use the second channel frequency without interference to/from the second radio component.

24. A user equipment device, comprising:
- a first radio component and a second radio component on a shared platform; and
- processor control logic and/or circuitry configured to provide a preferred frequency notification for the first radio component to reduce in-device coexistence interference from the second radio component by:
  - detecting at the first radio component in-device coexistence interference at a first channel frequency;
  - determining one or more unavailable channel frequencies in addition to the first channel frequency;
  - sending a coexistence interference indication message to a radio access network, wherein the coexistence interference indication message requests allocation of a frequency different from the first channel frequency and the one or more unavailable channel frequencies; and
  - receiving a response message at a downlink signaling channel frequency that is different from the first channel frequency, where the response message comprises one or more control parameters for establishing a second channel frequency for the first radio component that is different from the first channel frequency and the one or more unavailable channel frequencies.

25. The computer program product of claim 23, where detecting in-device coexistence interference comprises receiving an internal message that a second radio component is enabled.

26. The computer program product of claim 23, where the downlink signaling channel frequency is specified in a Radio Resource Control (RRC) message sent by the radio access network or as a system information block broadcast by the radio access network.

27. The computer program product of claim 23, further comprising instructions for sending the coexistence interference indication message a plurality of times.

28. The computer program product of claim 23, further comprising instructions for changing to the downlink signaling channel frequency in connection with sending the coexistence interference indication message.

29. The user equipment device of claim 24, where detecting in-device coexistence interference comprises receiving an internal message that a second radio component is enabled.

30. The user equipment device of claim 24, where the downlink signaling channel frequency is specified in a Radio Resource Control (RRC) message sent by the radio access network or as a system information block broadcast by the radio access network.

31. The user equipment device of claim 24, the processor further configured to provide sending the coexistence interference indication message a plurality of times.

32. The user equipment device of claim 24, the processor further configured to provide changing to the downlink signaling channel frequency in connection with sending the coexistence interference indication message.

33. A network node to reduce interference between first and second radio components located on a single platform at a user equipment (UE), comprising:
- one or more processors configured to:
  - receive a coexistence interference indication message indicating the existence at a first radio component of in-device coexistence interference at a first channel frequency caused by a second radio component, wherein the coexistence interference indication message-requests allocation of a frequency different from the first channel frequency and one or more unavailable channel frequencies; and
  - send a response message, using a downlink signaling channel frequency that is different from the first channel frequency, where the response message comprises one or more control parameters for establishing a second channel frequency for the first radio component that is different from the first channel frequency and the one or more unavailable channel frequencies.

34. The network node of claim 33, wherein the one or more processors configured to send a response message comprises the one or more processors configured to send a Radio Resource Control (RRC) message or broadcasting a system information block which specifies the downlink signaling channel frequency to the UE.

35. The network node of claim 33, where the RRC message comprises at least one of an RRCConnectionReconfiguration message, a UEInformationRequest message, an RRCConnectionRequest message, an RRCConnectionReconfigurationComplete message, an RRCConnectionReestablishmentRequest message, an RRCConnectionReestablishmentComplete message and a new RRC message to specify the downlink signaling channel frequency.

36. The network node of claim 33, the one or more processors further configured to:
- return to the first channel frequency to receive a second coexistence interference indication message if an acknowledge (ACK) message to the response message is not received on the downlink signaling channel frequency within a predetermined time period.

37. The network node of claim 33, the one or more processors further configured to:
- resend the response message if an acknowledge (ACK) message to the response message is not received within a predetermined time period.

* * * * *

UNITED STATES PATENT AND TRADEMARK OFFICE
CERTIFICATE OF CORRECTION

PATENT NO.        : 9,060,280 B2
APPLICATION NO.   : 13/194380
DATED             : June 16, 2015
INVENTOR(S)       : Changhoi Koo, Zhijun Cai and Youn Hyoung Heo It is certified that error appears in the above-identified patent and that said Letters Patent is hereby corrected as shown below:

In the Claims

In Column 23, Line 52, In Claim 9, delete "UElnformationRequest" and insert -- UEInformationRequest --, therefor.

In Column 24, Line 34, In Claim 18, delete "frequency" and insert -- frequency different from the first channel frequency and one or more unavailable channel frequencies --, therefor.

In Column 24, Line 48, In Claim 20, delete "UElnformationRequest" and insert -- UEInformationRequest --, therefor.

In Column 26, Line 45, In Claim 35, delete "UElnformationRequest" and insert -- UEInformationRequest --, therefor.

Signed and Sealed this
Twenty-eighth Day of June, 2016

Michelle K. Lee
*Director of the United States Patent and Trademark Office*